United States Patent
Gilman et al.

(10) Patent No.: US 10,365,911 B2
(45) Date of Patent: Jul. 30, 2019

(54) DETERMINING OPTIMAL UPDATE FREQUENCY FOR SOFTWARE APPLICATION UPDATES

(75) Inventors: Brian L. Gilman, Cary, NC (US); William G. Pagan, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1385 days.

(21) Appl. No.: 13/329,295

(22) Filed: Dec. 18, 2011

(65) Prior Publication Data

US 2013/0159985 A1    Jun. 20, 2013

(51) Int. Cl.
*G06F 8/65* (2018.01)
*G06Q 30/02* (2012.01)

(52) U.S. Cl.
CPC .......... *G06F 8/65* (2013.01); *G06Q 30/0282* (2013.01)

(58) Field of Classification Search
CPC .... G06F 8/60–68; G06F 3/1225; G06F 3/123; G06F 21/50–51; G06F 21/56; G06F 21/562; G06F 21/57; H04L 41/08–0889; H04L 41/5041–5054; H04L 63/12–123; G06Q 30/0282
See application file for complete search history.

(56) References Cited

U.S. PATENT DOCUMENTS

| | | | |
|---|---|---|---|
| 8,219,983 B1 * | 7/2012 | Sobel | G06F 8/60 717/126 |
| 8,255,902 B1 * | 8/2012 | Satish | 717/174 |
| 8,270,941 B2 * | 9/2012 | Kenagy | G06Q 20/10 345/533 |
| 8,347,386 B2 * | 1/2013 | Mahaffey et al. | 726/23 |
| 8,381,208 B2 * | 2/2013 | Burke et al. | 717/174 |
| 8,499,063 B1 * | 7/2013 | Satish et al. | 709/223 |
| 8,595,282 B2 * | 11/2013 | Nachenberg | 709/200 |
| 8,635,700 B2 * | 1/2014 | Richard | G06F 21/562 370/474 |
| 9,766,869 B2 * | 9/2017 | Sen | G06F 8/61 |
| 2006/0179431 A1 * | 8/2006 | Devanathan | G06F 8/61 717/168 |
| 2007/0050676 A1 * | 3/2007 | Bae | 714/38 |
| 2007/0203719 A1 * | 8/2007 | Kenagy | G06Q 20/10 705/39 |

(Continued)

OTHER PUBLICATIONS

"Device, n.", OED Online, Oxford University Press, 1989 [retrieved Nov. 18, 2014], Retrieved from Internet: <URL: http://www.oed.com/oed2/00062593>, pp. 1-6.*

(Continued)

*Primary Examiner* — Todd Aguilera
(74) *Attorney, Agent, or Firm* — Steven M. Greenberg, Esq.; Shutts & Bowen LLP

(57) ABSTRACT

Embodiments of the present invention provide a method, system and computer program product for configurably recommending a software application update. In an embodiment of the invention, a method for configurably recommending a software application update is provided. The method includes receiving an update for a software application along with a set of ratings for the update. The method also includes comparing in memory of a computer the set of ratings with a pre-stored threshold. Finally, the method includes prompting in the computer to apply the update to the software application responsive to the set of ratings meeting the pre-stored threshold.

3 Claims, 1 Drawing Sheet

(56) References Cited

U.S. PATENT DOCUMENTS

| | | | |
|---|---|---|---|
| 2007/0220607 A1* | 9/2007 | Sprosts et al. | 726/24 |
| 2010/0186009 A1* | 7/2010 | Sen | G06F 8/61 717/178 |
| 2010/0318986 A1* | 12/2010 | Burke et al. | 717/176 |
| 2011/0047620 A1* | 2/2011 | Mahaffey et al. | 726/23 |

OTHER PUBLICATIONS

"Device", Merriam-Webster [online], 2015 [retrieved Jul. 2, 2015], Retreived from Internet: <URL: http://www.merriam-webster.com/dictionary/device>, pp. 1-5.*

"Device", Oxford Dictionaries [online], 2015 [retrieved Jul. 2, 2015], Retrieved from Internet: <URL: http://www.oxforddictionaries.com/us/definition/american_english/device>, pp. 1-4.*

* cited by examiner

DETERMINING OPTIMAL UPDATE FREQUENCY FOR SOFTWARE APPLICATION UPDATES

BACKGROUND OF THE INVENTION

Field of the Invention

The present invention relates to software application update distribution and more particularly to determining a frequency of distributing software updates to end user devices.

Description of the Related Art

When a new software application is acquired (whether or not through licensing or outright purchase), the software application usually must be installed on the target data processing system before it can be used. Typically, software applications include as a component thereof an installer, which provides logic that substantially automates the installation process. In addition, computer operating systems typically include an installer for use in installing operating system updates, drivers or other operating system components. In addition, many commercial software applications are provided with a process by which they may be updated. Such a process can be included as a component of the software application itself, or the process may be provided externally.

The provision of an updating process is desirable because software applications are frequently modified by end users, for example by applying bug fixes or enhancements (such as new versions of the software). There are many different processes for installing and/or updating software applications. Some processes are entirely automated and substantially invisible to the user, while others are interactive. Some are complex while others are simpler. Program logic used to install new software applications, to install updates to existing software applications, and to uninstall (remove) software applications are referred to herein as "installers". The term "installers" is intended to encompass both "standalone" logic that can be used to install a variety of software applications (for example, such as installers that may be provided with an operating system), as well as logic adapted to install only a single software application (and may be integrated with the installation file package for that software application). Thus, installer applications, when run, implement a software installation process.

Installer applications generally prompt the end user only for the simple decision of installing an application update or deferring an available update. More sophisticated installer applications provide an indication of the degree of urgency in installing an available update before prompting the end user with a choice of proceeding with an installation or deferring installation of an available update. For computer software experiencing only a few updates over an extended period of time, little more is required to facilitate in the determination by an end user as to whether or not to proceed with an application update. However, with the advent of agile software development, updates to deployed applications can be much more frequent. For an end user facing weekly if not daily proposals by an installer application to update an application, it can be difficult to determine which updates to apply and which to defer.

BRIEF SUMMARY OF THE INVENTION

Embodiments of the present invention address deficiencies of the art in respect to software application updating and provide a novel and non-obvious method, system and computer program product for configurably recommending a software application update. In an embodiment of the invention, a method for configurably recommending a software application update is provided. The method includes receiving an update for a software application along with a set of ratings for the update. The method also includes comparing in memory of a computer the set of ratings with a pre-stored threshold. Finally, the method includes prompting in the computer to apply the update to the software application responsive to the set of ratings meeting the pre-stored threshold.

In one aspect of the embodiment, the set of ratings are stored in response to the rating not meeting the pre-stored threshold. In another aspect of the embodiment, prior to the comparing of the set of ratings to the pre-stored threshold, the set of ratings is combined with a set of previously stored ratings. In yet another aspect of the embodiment, the update is automatically applied responsive to the rating meeting the pre-stored threshold.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for configurably recommending a software application update. In an embodiment of the invention, a set of ratings can be applied to an update to a software application. The set of ratings can be provided in meta-data associated with the update to the software application and can be assigned individually to different aspects of the update such as different functions of the update or different consequences of installing the update. Thereafter, a recipient of the update can compare the set of ratings to one or more predetermined threshold values. If the set of ratings when considered as a whole satisfies a threshold criteria or criterion, the recipient can be prompted to apply the upgrade to the software application.

Figure 1:
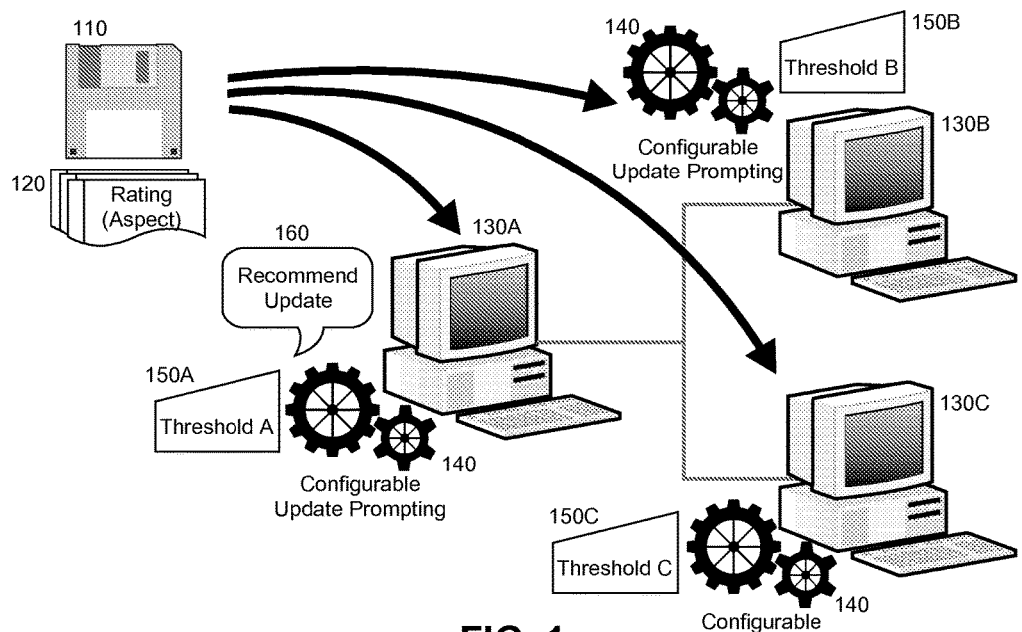
FIG. 1 is a pictorial illustration of a process for configurably recommending a software application update.

In further illustration, FIG. 1 pictorially shows a process for configurably recommending a software application update. As shown in FIG. 1, a set of ratings 120 can be associated with an update 110 for a software application. The set of ratings 120 can pertain to an aggregation of ratings of the importance or advisability of applying the update 110 to the software application, or the set of ratings 120 can be a composite score of individual ratings each pertaining to a particular function or portion or result of the update 110. Thereafter, the update 110 with the set of ratings 120 can be forwarded to different end user computing devices 130A, 130B, 130C. Upon receipt of the update 110 with the set of ratings 120, configurable update prompting logic 140 can extract the rating 120 and compare the set of ratings 120 to pre-stored threshold criteria or criterion 150A, 150B, 150C established for each of the different end user computing devices 130A, 130B, 130C. To the extent that the configurable update prompting logic 140 determines the rating 120 to satisfy the threshold criteria or criterion 150A, 150B, 150C, a prompt 160 can be provided recommending that the update 110 is applied to the software application.

Figure 2:
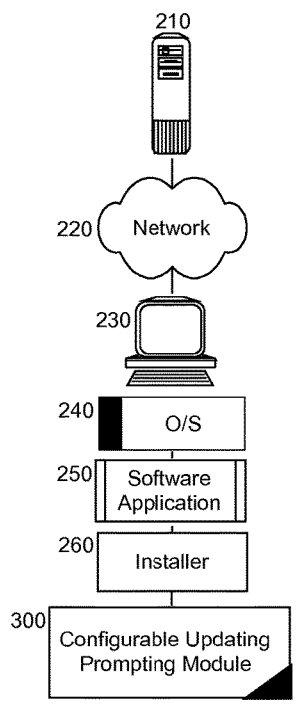
FIG. 2 is a schematic illustration of an application update installation data processing system configured for configurably recommending a software application update; and, FIG. 3 is a flow chart illustrating a process for configurably recommending a software application update.

The process described in connection with FIG. 1 can be implemented within an application update data processing system FIG. 2 is a schematic illustration of an application update installation data processing system configured for configurably recommending a software application update. The system can include a host computer 230 with at least one processor and memory configured for communicative coupling to a server 210 over computer communications network 220. The host computer 230 can include an operating system 240 hosting the execution of a software application 250. An installer 260 in turn can be coupled to the software application 250 and can be configured to install updates to the software application 250.

Of note, a configurable updating prompting module 300 can be coupled to the installer 260. The module 300 can include program code that when executed in the memory of the host computer 230 can be enabled to receive a set of ratings for an update for the software application 250 and to compare the set of ratings to a pre-stored value or set of values. The set of ratings can be compared to corresponding pre-stored values individually and then an aggregate determination based upon the individual comparisons can be provided, or the set of ratings can be a composition of different values to be compared to a single threshold value. To the extent that the program code of the module 300 determines the set of ratings to have met the threshold represented by the pre-stored value, the update can be viewed critical enough to warrant the prompting of the end user to apply the update to the software application 250. To the set of ratings are determined not to have met the threshold represented by the pre-stored value, the program code of the module 300 can store the set of ratings for combination with a subsequently received set of ratings for a next received update.

Figure 3:
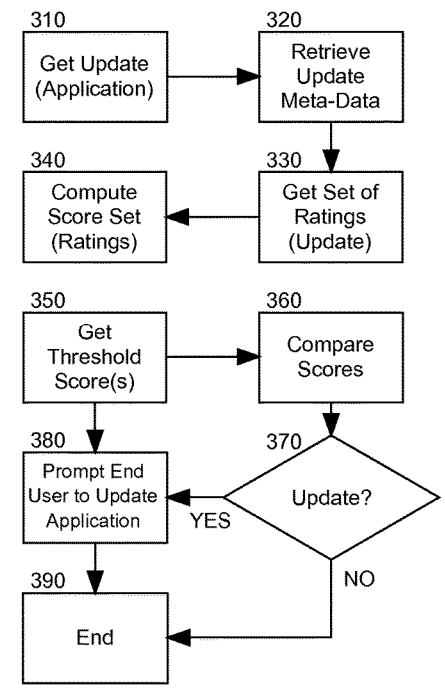

In even yet further illustration of the operation of the configurable updating prompting module 300, FIG. 3 is a flow chart illustrating a process for configurably recommending a software application update. Beginning in block 310, an update 310 can be received for an application. The update can include one or more updated components for a component based application executing in a container of an application server in memory of a host computer. In block 320 update meta-data can be extracted for the update indicating a set of ratings for the update. In block 330, the set of ratings can be retrieved from the meta-data and in block 340, a composite score can be computed for the set of ratings including combining the set of ratings with any previously received and stored set of ratings.

In block 350 a pre-stored threshold value can be retrieved and in block 360 the pre-stored value can be compared to the computed score. In decision block 370 it can be determined if the comparison indicates that the computed score is at least of a value indicative of the subjective selection of the end user to be prompted to apply the update to the software application. If so, in block 380 the end user can be prompted to apply the update to the software application. Alternatively, the update can be applied automatically, Thereafter, the process can end in block 390.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for configurably applying a software application update, the method comprising:
    receiving in an end user computing device, an update for a software application along with meta-data describing different, individual ratings, each of the different, individual ratings of a different one of the multiple different functions of the update;
    extracting from the meta-data the different, individual ratings;
    comparing in memory of a computer the extracted, different, individual ratings with pre-stored threshold criteria established for the end user computing device; and,
    responsive to each of the extracted different individual ratings not meeting the pre-stored threshold criteria: storing each of the extracted different individual ratings and upon receiving a next update for the software application, extracting from meta-data accompanying the next update, a new set of individual ratings, combining the new set of individual ratings with the stored individual ratings and comparing the combination of individual ratings to the pre-stored threshold criteria, and automatically applying the next update responsive to the combination of individual ratings meeting the pre-stored threshold criteria.

2. A software application update data processing system comprising:
    a host computer comprising at least one processor and memory;
    a software application installed in the host computer;
    an installer coupled to the software application and executing in the memory of the host computer; and,
    a configurable updating module coupled to the installer, the module comprising program code enabled to receive in an end user computing device, an update for a software application along with meta-data describing different, individual ratings, each of the different, individual ratings of a different one of the multiple different functions of the update, to extract from the meta-data the different, individual ratings to compare in memory of a computer the extracted, different, individual ratings with pre-stored threshold criteria established for the end user computing device, and responsive to each of the extracted different individual ratings not meeting the pre-stored threshold criteria: to store each of the extracted different individual ratings and upon receiving a next update for the software application, extract from meta-data accompanying the next update, a new set of individual ratings, combine the new set of individual ratings with the stored individual ratings and compare the combination of individual ratings to the pre-stored threshold criteria, and automatically apply the next update responsive to the combination of individual ratings meeting the pre-stored threshold criteria.

3. A computer program product for configurably applying a software application update, the computer program product comprising:

a computer readable storage medium comprising a device having computer readable program code embodied therewith, wherein the computer readable storage medium is not a transitory signal per se, the computer readable program code comprising:

computer readable program code for in an end user computing device, an update for a software application along with meta-data describing different, individual ratings, each of the different, individual ratings of a different one of the multiple different functions of the update;

computer readable program code for extracting from the meta-data the different, individual ratings;

computer readable program code for comparing in memory of a computer the extracted, different, individual ratings with pre-stored threshold criteria established for the end user computing device; and, computer readable program code for responsive to each of the extracted different individual ratings not meeting the pre-stored threshold criteria: storing each of the extracted different individual ratings and upon receiving a next update for the software application, extracting from meta-data accompanying the next update, a new set of individual ratings, combining the new set of individual ratings with the stored individual ratings and comparing the combination of individual ratings to the pre-stored threshold criteria, and automatically applying the next update responsive to the combination of individual ratings meeting the pre-stored threshold criteria.

* * * * *